US010443542B2

(12) United States Patent
Hue et al.

(10) Patent No.: US 10,443,542 B2
(45) Date of Patent: Oct. 15, 2019

(54) SYSTEM FOR LOCKING A THRUST REVERSER WITH FLAPS, COMPRISING LOCKS FOR AN INTERMEDIATE OPENING POSITION

(71) Applicant: AIRCELLE, Gonfreville l'Orcher (FR)

(72) Inventors: Corentin Hue, Le Havre (FR); Rodolphe Denis, Le Havre (FR); Denis Guillois, Limours (FR); Sarah Tissot, Bois d'Arcy (FR)

(73) Assignee: AIRCELLE, Gonfreville l'orcher (FR)

( * ) Notice: Subject to any disclaimer, the term of this patent is extended or adjusted under 35 U.S.C. 154(b) by 161 days.

(21) Appl. No.: 15/283,591

(22) Filed: Oct. 3, 2016

(65) Prior Publication Data
US 2017/0022935 A1 Jan. 26, 2017

Related U.S. Application Data

(63) Continuation of application No. PCT/FR2015/050863, filed on Apr. 2, 2015.

(30) Foreign Application Priority Data

Apr. 2, 2014 (FR) ...................................... 14 52930

(51) Int. Cl.
F02K 1/72 (2006.01)
F02K 1/76 (2006.01)
(Continued)

(52) U.S. Cl.
CPC ............... *F02K 1/766* (2013.01); *F02K 1/60* (2013.01); *F02K 1/62* (2013.01); *F02K 1/70* (2013.01);
(Continued)

(58) Field of Classification Search
CPC . F02K 1/766; F02K 1/763; F02K 1/60; F02K 1/62; F02K 1/70; F02K 1/56; F02K 1/64; F02K 1/76; F02K 1/72
See application file for complete search history.

(56) References Cited

U.S. PATENT DOCUMENTS 2,620,622 A * 12/1952 Lundberg .................. F02K 1/60
239/265.37
3,532,275 A * 10/1970 Hom ........................ F02K 1/60
239/265.33
(Continued)

FOREIGN PATENT DOCUMENTS

FR 926359 9/1947
GB 930781 7/1963
(Continued)

OTHER PUBLICATIONS

International Search Report for International Application PCT/FR2014/050863, dated Jul. 23, 2015.

Primary Examiner — William H Rodriguez
(74) Attorney, Agent, or Firm — Burris Law, PLLC

(57) ABSTRACT

The present disclosure relates to a system for locking the position of the flaps of a thrust reverser of a turbojet nacelle, said flaps being controlled by actuators, each one swinging about a tranverse pivot in order to partially close off the air stream so as to guide it forwards, further including locks for locking the flaps in an intermediate opening position, between the closed position and the open position.

11 Claims, 2 Drawing Sheets

(51) Int. Cl.
*F02K 1/60* (2006.01)
*F02K 1/70* (2006.01)
*F02K 1/62* (2006.01)

(52) U.S. Cl.
CPC ........ *F02K 1/763* (2013.01); *F05D 2220/323* (2013.01); *F05D 2260/52* (2013.01)

(56) References Cited

U.S. PATENT DOCUMENTS

| | | | | |
|---|---|---|---|---|
| 3,567,128 A * | 3/1971 | Urquhart | ............ | F02K 1/60 239/265.29 |
| 4,194,692 A * | 3/1980 | Dickenson | ............ | F02K 1/002 239/265.33 |
| 4,790,495 A * | 12/1988 | Greathouse | ............ | F02K 1/60 239/265.29 |
| 4,966,327 A * | 10/1990 | Fage | ............ | F02K 1/11 239/265.29 |
| 5,224,342 A * | 7/1993 | Lair | ............ | F02K 1/766 239/265.33 |
| 5,826,823 A * | 10/1998 | Lymons | ............ | B64D 33/04 244/110 B |
| 5,956,939 A * | 9/1999 | Fage | ............ | F02K 1/06 239/265.19 |
| 6,311,928 B1 * | 11/2001 | Presz, Jr. | ............ | B64D 33/04 239/265.29 |
| 6,845,945 B1 * | 1/2005 | Smith | ............ | B64D 33/04 239/265.19 |
| 2003/0218094 A1 * | 11/2003 | Lair | ............ | B64D 33/04 244/110 B |
| 2016/0208740 A1 * | 7/2016 | Hue | ............ | F02K 1/76 |
| 2018/0038313 A1 * | 2/2018 | Wawrzynek | ............ | F02K 1/763 |

FOREIGN PATENT DOCUMENTS

| | | |
|---|---|---|
| WO | 2003/100241 | 12/2003 |
| WO | 2008/142243 | 11/2008 |
| WO | 2011/073558 | 6/2011 |

\* cited by examiner

SYSTEM FOR LOCKING A THRUST REVERSER WITH FLAPS, COMPRISING LOCKS FOR AN INTERMEDIATE OPENING POSITION

CROSS-REFERENCE TO RELATED APPLICATIONS

This application is a continuation of International Application No. PCT/FR2015/050863, filed on Apr. 2, 2015, which claims the benefit of FR 14/52930 filed on Apr. 2, 2014. The disclosures of the above applications are incorporated herein by reference.

FIELD

The present disclosure concerns a locking system of a thrust reverser with doors for a nacelle of a turbojet engine, as well as a nacelle of a turbojet engine including such a locking system.

BACKGROUND

The statements in this section merely provide background information related to the present disclosure and may not constitute prior art.

In general, motorization assemblies for aircrafts include a nacelle forming a generally revolution-shaped external envelope, receiving thereinside a turbojet engine disposed along the longitudinal axis of this nacelle. The turbojet engine receives fresh air coming from the upstream or front side, and discharges, on the downstream or rear side, the hot gases resulting from the combustion of fuel, which provide a certain thrust.

Bypass turbojet engines present, around this turbojet engine, fan blades generating a significant secondary cold air flow along an annular flow path passing between the engine and the nacelle, which provides most of the thrust on civil transport aircrafts.

A known type of thrust reverser, presented in particular in document WO-A1-2008/142243, includes a thrust reverser equipped with doors disposed at the rear of the nacelle, each pivoting about a transverse axis so as to deploy in order to partially close the backward air flow. In their open and deployed positions, the doors divert the air flow radially outwards though the transverse counter-thrust openings cleared by this deployment, and orientate this flow forwards.

Opening of the thrust reverser is controlled by actuators which may be electric or hydraulic.

In general, the complete deployment of the doors is performed only for the lowest speeds of the aircraft, when it rolls on the landing runway. An opening of these doors in flight may be considered at a limited angle, in order that the mechanical stresses related to the aerodynamic efforts due to the speed do not be too high.

In this case, there should then be provided actuators of the doors which hold an intermediate position of these doors, between the two end-of-strokes of the closed position and the fully deployed position. The actuators are then subjected to a permanent stress for a long time, which results in a fatigue strain requiring a particular sizing in order to obtain reliability and safety.

SUMMARY

The present disclosure provides a system for locking the position of the doors of a thrust reverser of a nacelle of a turbojet engine, the doors being controlled by actuators, each actuator tilting about a transverse pivot in order to partially close the air flow so as to direct it forwards, characterized in that it includes locks intended to lock an intermediate opening position of the doors, between the closed position and the fully deployed position.

One advantage of this locking system is that the actuation of the locks can, in a simple, economical and effective manner, block an intermediate opening position of the doors which corresponds in particular to the maximum opening permissible in flight, without biasing the actuators of the doors in order to hold this position, which are not then subjected to fatigue strain.

In addition, the locking system according to the present disclosure may include one or more of the following features, which may be combined together.

Advantageously, the locking system includes cams rotatably linked to the pivots of the doors, on which the locks act. This cam system is simple and effective.

In particular, each cam may include a spiral-shaped external portion, which is terminated by a step in which the lock fits so as to ensure blocking of this cam.

Advantageously, the locks are guided axially so as to slide and move in the locked position. The axial guidance allows resisting significant lateral efforts.

In this case, the locking system may include two locks mounted opposite to each other, which are controlled simultaneously so as to separate from each other, and each locks one of the doors of the thrust reverser. Thus, the effort of the actuator of the locks may be balanced between these two locks.

Advantageously, the locking system includes a device which, in the absence of effort of the actuator of the locks, hold the locked position of these locks blocked for an axial force applied thereon. Thus, locking safety can be provided.

In one form, the device may include two tie rods each controlling one of the locks, linked to each other along a transverse axis, for the intermediate opening position of these tie rods moving in a position substantially aligned along the transverse axis of these locks.

Advantageously, the locking system includes springs applying a pressure which tends to set the locks in the locking position of the intermediate opening position of the doors. Thus, the position is held in the absence of any command.

In this case, each tie rod may receive the permanent support of a spring.

In another form, a nacelle of a turbojet engine is also provided with a thrust reverser having doors equipped with a locking system comprising any one of the preceding features.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
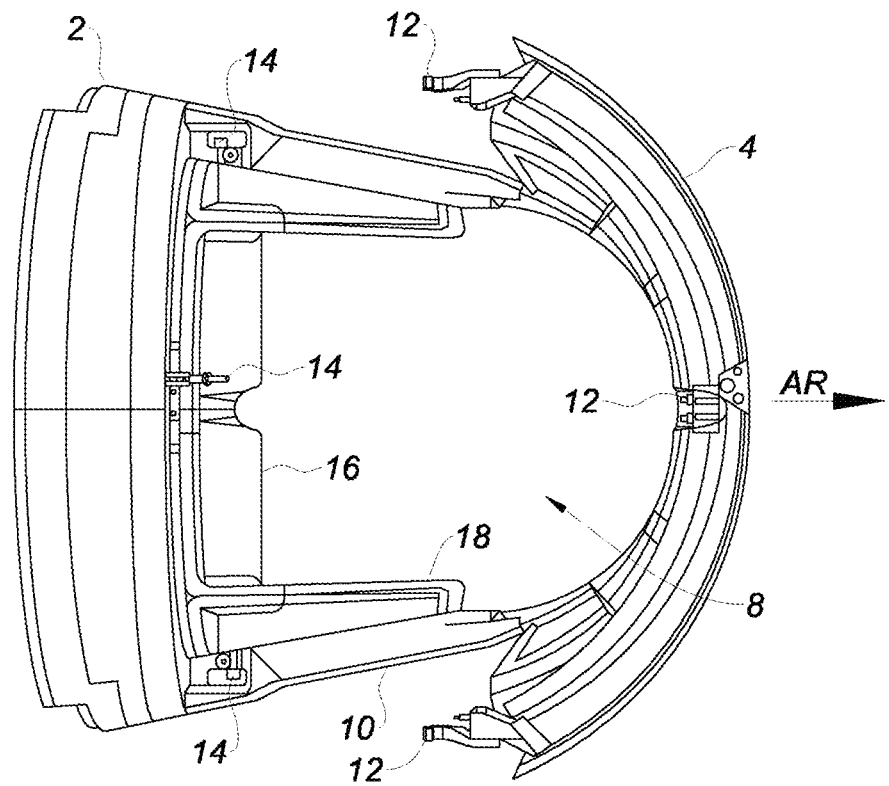
FIG. 1 is a half-view of a thrust reverser according to the present disclosure, which is cut in an axial plane of symmetry between the two doors.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
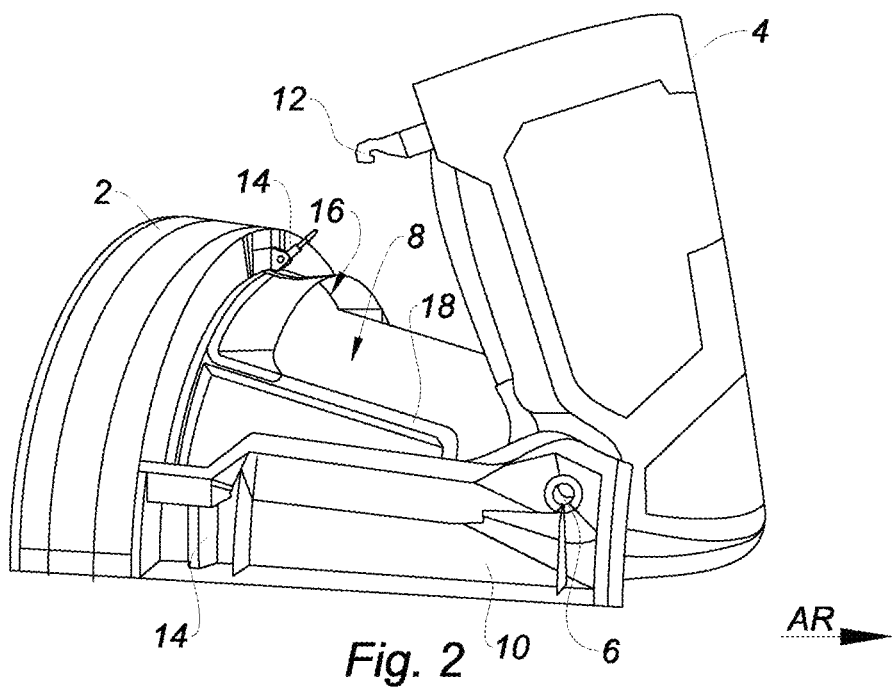
FIG. 2 is a perspective side half-view of the thrust reverser of FIG. 1.

FIGS. 1 and 2 present a fixed circular structure 2 located at the rear of a nacelle receiving a turbojet engine disposed along a main axis, which discharges a gas flow to the rear indicated by the arrow "AR." The half-views of these figures are cut by the plane of symmetry between the two doors 4, which may have any inclination in the aircraft.

The thrust reverser set includes an axial plane of symmetry which is perpendicular to the plane of symmetry between the two doors 4.

Each side of the fixed structure 2 includes a lateral arm 10 extending to the rear, receiving in each angle of its rear portion a transverse pivot 6 of a door forming a cowl 4.

Each door 4 may tilt about its two transverse pivots 6 by raising the front portion, as presented in FIGS. 1 and 2, so as, on the one hand, to substantially close the passage to the rear of the gases coming from the turbojet engine and the annular flow path surrounding it, and on the other hand, to divert this flow forwards through the transverse counter-thrust openings 8 opened by this tilting movement, so as to partially return it forwards.

The front of each cowl 4 includes at the center and at each side a hook 12 secured in a lock 14 linked to the fixed structure 2, when this cowl is closed.

A diverting edge 16 prolongs the rear portion of the fixed structure 2, by advancing in the counter-thrust opening 8. The fixed structure 2 receives at each side of the counter-thrust opening 8, a sidewall 18 disposed in the continuity of the diverting edge 16.

Figure 3:
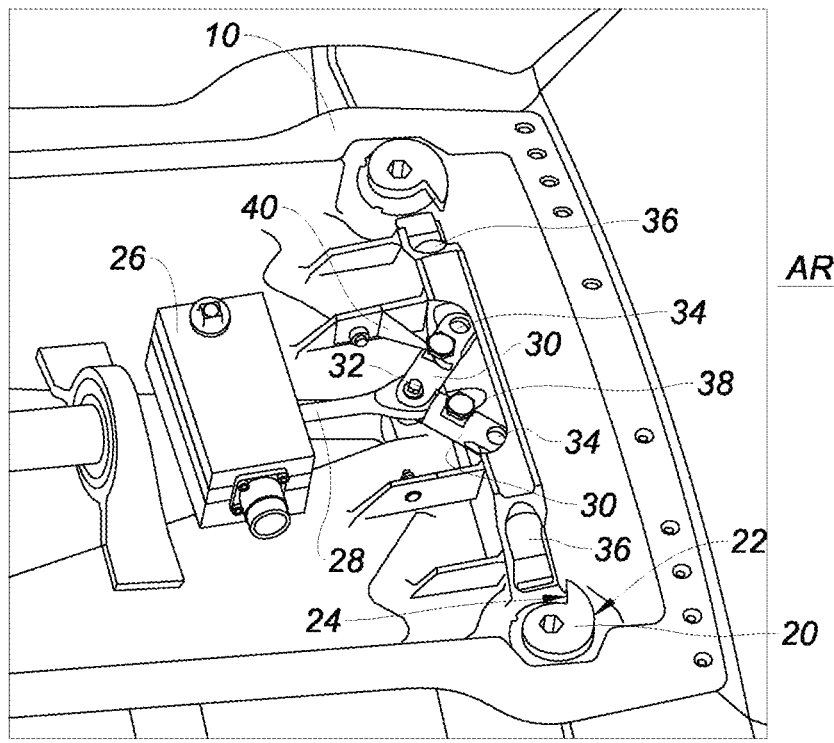
FIG. 3 is a perspective side view presenting the ends of the pivots of the two doors, the intermediate position of the doors not being locked.

FIG. 3 presents the end of each pivot of a door of the thrust reverser, held in the lateral arm 10, which receives a cam 20 disposed in a plane perpendicular to the axis of this pivot. The cam 20 includes an external profile forming a spiral 22 with an increasing radius, which is terminated by a step 24 projecting inwards.

The lateral arm 10 supports an electric actuator 26 comprising a control connecting rod 28 disposed parallel to the axis of the nacelle, in the horizontal plane of symmetry between the two doors 4. The control connecting rod 28 slides axially under the effect of its actuator 26.

A transverse axis 32 guided in a transverse bore of the rear end of the control connecting rod 28, is engaged at each side of this connecting rod in a bore of the front end of a tie rod 30. Thus, the two tie rods 30 are hinged about the rear end of the connecting rod 28, in a plane perpendicular to the pivots of the doors of the thrust reverser.

The lower end of the transverse axis 32 circulates in a longitudinal groove 38 formed in the lateral arm 10.

The rear end of each tie rod 30 is linked by a transverse axis 34 to the so-called inner end of a sliding lock 36. The two locks 36 aligned along each other, are slidingly guided in a bore of the lateral arm 10, along an axis passing by the two pivots of the doors.

Each tie rod 30 receives the permanent support of a spring leaf 40 which is secured on a rib of the lateral arm 10, in order to apply an effort tending to move back these tie rods so as to bring away the locks 36 outwards. The springs 40 assist the backward movement of the control connecting rod 28 during the movement of the actuator 26.

When the control connecting rod 28 is in its forward position, as presented in FIG. 3, the two tie rods 30 form an angle of about 45° with this connecting rod. The two transverse axes 34 of the rear ends of the tie rods 30 are brought close to each other, the two locks 36 are then pulled inwards.

The outer end of each lock 36 is then separated from the cam 20, it cannot engage in the step 24 of this cam. The cam 20 can rotate freely in either direction, without being stopped by the lock 26.

Figure 4:
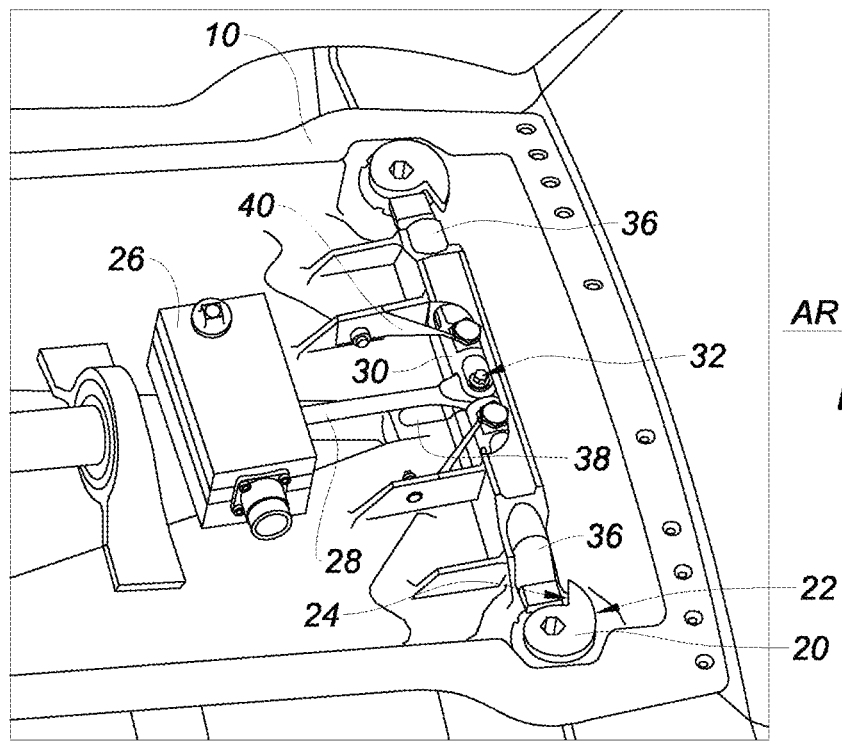
FIG. 4 is a perspective view as in FIG. 3, with the intermediate position of the doors being locked.

When the control connecting rod 28 is in its rearward position, as presented in FIG. 4, the two tie rods 30 are substantially aligned, forming a right angle with this connecting rod. The two transverse axes 34 of the rear ends of the tie rods 30 are brought away from each other, the two locks 36 are then pushed outwards in a locked position.

In this case, the outer end of each lock 36 is engaged in the step 24 of the cam 20. The cam 20 is then blocked in an angular position corresponding to an intermediate opening of the door, with a possible direction of rotation enabling only a closure of this door.

The intermediate opening of the door corresponds to the maximum opening position permissible for the aircraft in flight, so as not to generate too significant stresses in the thrust reverser.

Thanks to the spiral-shaped external profile 22 of the cam 20, it is possible, when the doors of the thrust reverser are closed, to have a closure of the locks 36 by the actuator 26, which bear on this spiral-shaped profile. The locks 36 then slide on the spiral-shaped profile 22 during the opening of the doors, so as to block the intermediate position when the step 24 bears on these locks, and prevent a wider opening.

It will be noted that the outwardly locked position of the locks 36 is completely blocked by the aligned position of the tie rods 30, held by the rearward support of the springs 40. Regardless of the axial force applied inwardly on the locks 36, the tie rods 30 can no longer be inclined, which inhibits a retraction of these locks.

Advantageously, position sensors allow controlling the position of the locks 36 or of their control elements, in order to secure this locking system.

In the case of a loss of control of the actuators of the thrust reverser, the springs 40 then act so as to move back the tie rods 30 and bring the locks 36 outwards. The doors of the thrust reverser cannot then surpass the intermediate position, which provides safety during flights.

For a complete opening of the thrust reverser, which may take place when the aircraft touches the runway, a retraction of the locks 36 should then be commanded. In particular, it is possible to detect this contact on the runway by a load on the wheels of the aircraft, in order to secure this complete opening.

Thus, securing the locks in the locked position is provided for a thrust reverser which may be opened in flight, the actuator 26 not consuming energy and not being subjected to stress, which allows easily ensuring a good reliability thereto.

Moreover, in the case where two doors of the thrust reverser are not linked to each other in their deployment movements, each lock 36 blocking one of the doors is advantageously sized to hold the other door so as to ensure safety in case of a failure of one of the locks.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser for a nacelle of a turbojet engine comprising doors controlled by actuators, the doors tilting about a transverse pivot in order to partially close air flow so as to direct the air flow forwards, and comprising a system for locking the position of the doors, wherein the locking system comprises:
   locks configured to lock the doors in an intermediate opening position,
   wherein the intermediate opening position is a position between a closed position and a fully deployed position,
   wherein an actuation of said locks blocks the doors in said intermediate opening position so that the actuators of the doors are not actuated in order to hold the doors in the intermediate opening position, and
   wherein the locking system includes cams rotatably linked to the transverse pivot of the doors, on which the locks act.

2. The thrust reverser according to claim 1, wherein each cam includes a spiral-shaped external portion terminated by a step in which the lock fits so as to provide blocking of the cam.

3. The thrust reverser according to claim 1, wherein the locking system includes springs applying a pressure which tends to set the locks in a locking position of the intermediate opening position of the doors.

4. A nacelle of a turbojet engine provided with a thrust reverser according to claim 1.

5. A thrust reverser for a nacelle of a turbojet engine comprising doors controlled by actuators, the doors tilting about a transverse pivot in order to partially close air flow so as to direct the air flow forwards, and comprising a system for locking the position of the doors, wherein the locking system comprises:
   locks configured to lock the doors in an intermediate opening position,
   wherein the intermediate opening position is a position between a closed position and a fully deployed position,
   wherein an actuation of said locks blocks the doors in said intermediate opening position so that the actuators of the doors are not actuated in order to hold the doors in the intermediate opening position, and
   wherein the locks are guided axially so as to slide and move in a locked position.

6. The thrust reverser according to claim 5, wherein the locking system includes two locks mounted opposite to each other, the two locks being controlled simultaneously so as to separate the two locks, and each of the two locks functions to lock one of the doors of the thrust reverser.

7. The thrust reverser according to claim 6, wherein the locking system includes a device which, in the absence of effort of the actuator of the locks, holds the locked position of the locks that are blocked from an axial force applied thereon.

8. The thrust reverser according to claim 7, wherein the device includes two tie rods each controlling one of the locks, linked to each other along a transverse axis, the intermediate opening position of the tie rods moving in a position substantially aligned along the transverse axis of the locks.

9. The thrust reverser according to claim 8, wherein each tie rod receives the permanent support of a spring.

10. The thrust reverser according to claim 5, wherein the locking system includes springs applying a pressure which tends to set the locks in a locking position of the intermediate opening position of the doors.

11. A nacelle of a turbojet engine provided with a thrust reverser according to claim 5.

* * * * *